United States Patent [19]

Hsieh

[11] Patent Number: 4,923,022

[45] Date of Patent: May 8, 1990

[54] AUTOMATIC MAILING APPARATUS

[75] Inventor: Tzu-Yen Hsieh, Taipei, Taiwan

[73] Assignee: Chien-Hua Chang, Taou-Yuan, Taiwan

[21] Appl. No.: 343,002

[22] Filed: Apr. 25, 1989

[51] Int. Cl.$^5$ .................... G01G 23/38; G01G 23/22; B07C 5/00; B07C 9/00

[52] U.S. Cl. .................... 177/4; 177/25.15; 364/464.03; 209/564; 209/698; 209/900

[58] Field of Search ............... 177/4, 25.15; 364/464.03

[56] References Cited

U.S. PATENT DOCUMENTS

3,861,480  1/1975  Zucker et al. ............ 177/229 X
4,488,610  12/1984 Yankloski ............... 177/25.15 X
4,516,209  5/1985  Scribner ............... 177/25.15 X Primary Examiner—George H. Miller, Jr.
Attorney, Agent, or Firm—Christensen, O'Connor, Johnson & Kindness

[57] ABSTRACT

An automatic mailing apparatus comprises a transfer device, a weighing device, a stamping device, a detecting device and a collecting device. The automatic mailing apparatus is an automatic machine in the shape of a case. The case has a front panel for mailing operations and a letter insertion and retrieval slot formed in the front panel. A letter to be mailed may be inserted into the case through the letter insertion and retrieval slot and automatically transferred for weighing, stamping and sorting.

7 Claims, 5 Drawing Sheets

AUTOMATIC MAILING APPARATUS

BACKGROUND OF THE INVENTION

This invention relates to a mailing apparatus, and more particularly to an automatic mailing apparatus in which a letter to be mailed is automatically transferred, weighed, stamped and sorted.

Recently, the amount of mail which must be processed by post offices is increasing rapidly in direct relation to the rate of population growth. It is therefore difficult for a district post office to increase mailing services to accommodate the ever-growing demands that the public makes on the postal system. Because post offices now must handle more postal matters than ever before, much more time is required for common mailing procedures such as weighing, stamping and sorting letters. Moreover, most post offices are only open for business during the day, thus inconveniencing those persons wishing to post registered letters or international letters etc., at times not coinciding with standard business hours.

SUMMARY OF THE INVENTION

It is therefore an object of this invention to provide an automatic mailing apparatus that automatically weighs, stamps and sorts mail so as to save processing time in a post office.

It is another object of this invention to provide an automatic mailing apparatus that can continually provide service and that can be installed everywhere for the shake of convenience.

Accordingly, an automatic mailing apparatus of this invention comprises a casing with an upper and a lower portion, the upper portion including a front panel having a letter insertion and retrieval slot formed therein for mailing operations;

a transfer means mounted in the casing behind the letter insertion and retrieval slot of the front panel and provided with a driving mechanism and conveyors for performing letter transferring operations;

a weighing means mounted in a middle portion of the transfer means in the casing with an electronic weighing balance for indicating the weight of a letter to be mailed;

a detecting means installed behind the front panel for detecting the mailing operations performed on the front panel and indicating the detected results;

a stamping means installed in a rear portion of the transfer means in the casing which includes a stamping plate and a stamper driven by said driving mechanism for stamping a letter being weighed by the weighing means;

a collecting device installed in the lower portion of the casing which has an inclined guiding plate mounted below the transfer means, a plurality of collecting boxes provided below the guiding plate, and a plurality of gates formed in the guiding plate; wherein, each of the gates is controlled by a solenoid valve so that a letter to be mailed will drop into one of the collecting boxes through one of the gates respectively facing the collecting boxes; whereby a letter received from the letter insertion and retrieval slot can be automatically transferred for weighing, stamping and sorting. Therefore, the letters held within said casing of this invention will have already been weighed, stamped and sorted when the postal worker retrieves them, thus saving on the normal time required for letter-processing in a post office. In addition, a person can mail registered or international letters, etc., at any time of day or night, whenever said automatic mailing apparatuses are installed.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF A PREFERRED EMBODIMENT

Figure 1:
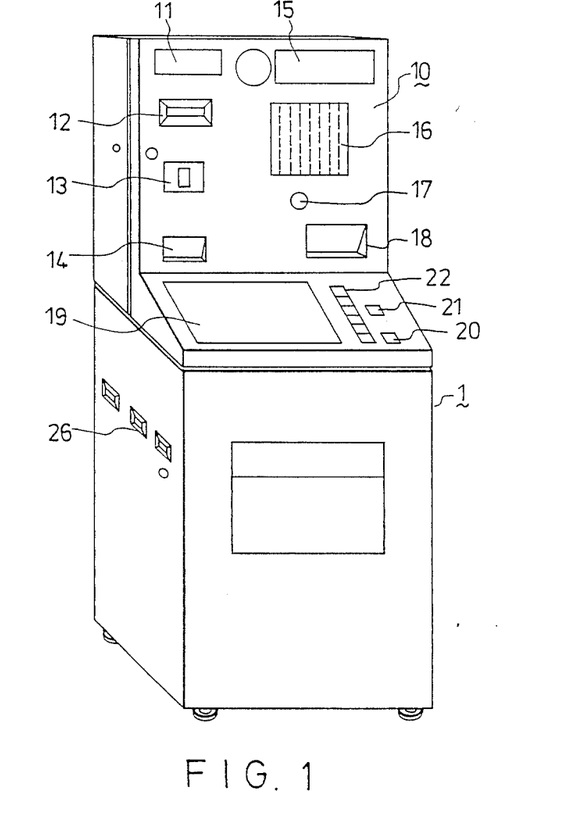
FIG. 1 is a perspective view of a preferred embodiment of an automatic mailing apparatus of the present invention.
Figure 2:
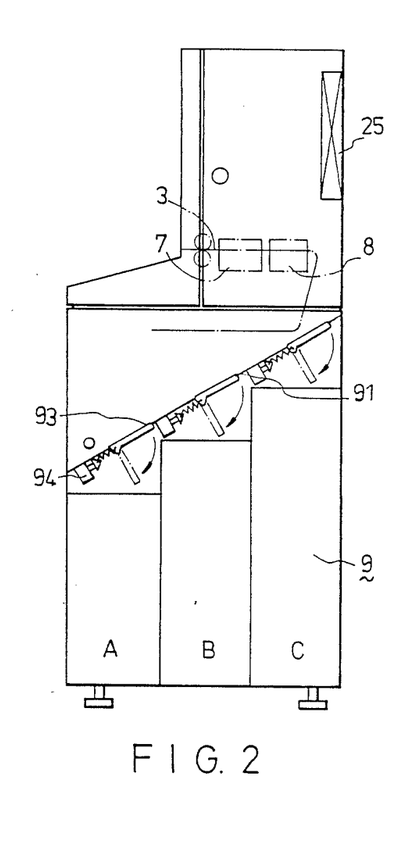
FIG. 2 is a right side schematic view showing the inner structure of the automatic mailing apparatus shown in FIG. 1.
Figure 3:
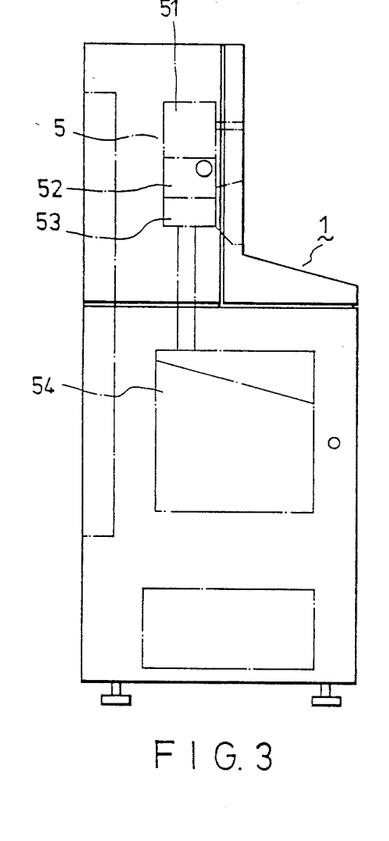
FIG. 3 is a left side schematic view showing the inner structure of the automatic mailing apparatus shown in FIG. 1.
Figure 4:
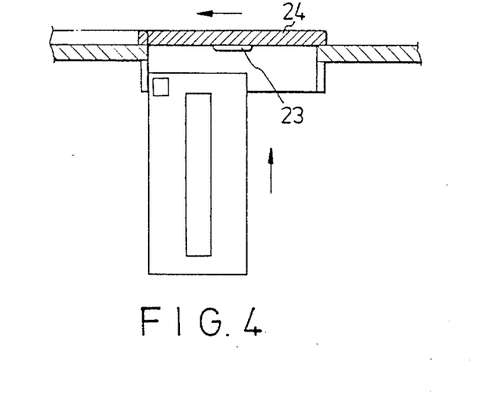
FIG. 4 is a schematic view illustrating a letter in an inserting position.
Figure 5:
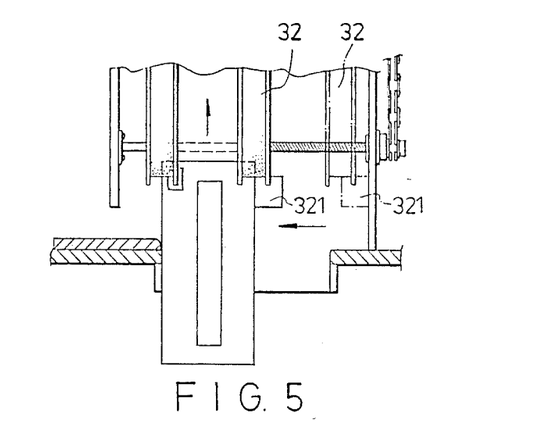
FIG. 5 is a schematic view illustrating the movement of a set of right conveyors of this invention when a letter is initially inserted.

Referring to FIGS. 1 to 3, a perspective, a right side and a left side view of a preferred embodiment of an automatic mailing apparatus are shown. The automatic mailing apparatus comprises a casing 1, a transfer means 3, a detecting means 5, a weighing means 7, a stamping means 8 and a collecting device 9. The casing 1 includes a front panel 10 for mailing operation. The front panel 10 is a combination of an upper panel and a lower panel. An indicating light 11, a magnetic-card slot 12, a coin slot 13, a coin-return assembly 14, a name card 15, an instruction plate 16, a trouble lamp 17 and a letter insertion and retrieval slot 18, are provided at the upper panel of the front panel 10. The lower panel is provided with a display screen 19, an on/off control switch 20, a letter-return key 21 and a plurality of letter-sorting keys 22. A slidable shielding plate 23 is installed behind the letter insertion and retrieval slot 18 for allowing the entrance of a letter while protecting the inside of the device from dust. An electric eye 24 is provided adjacent the letter insertion and retrieval slot 18, as shown in FIG. 4. The casing 1 has a radiating system 25 at the rear side thereof and a plurality of letter finishing slots 26 at the lower side thereof for receiving finished letters.

Figure 6:
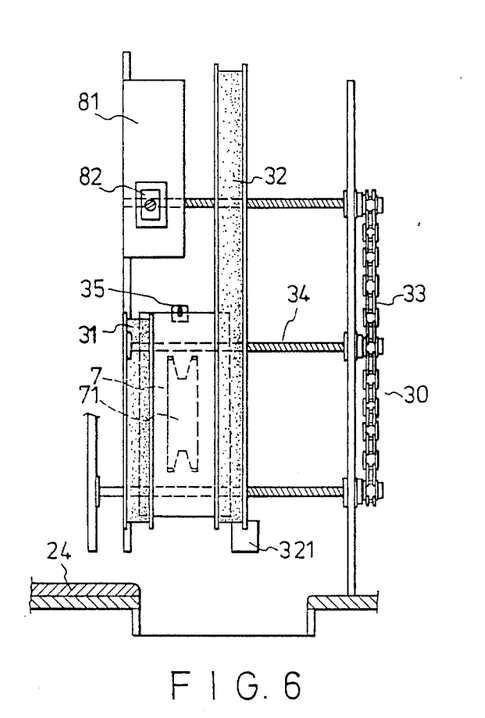
FIG. 6 is a schematic top view illustrating a driving mechanism, a weighing means and a stamping means of a preferred embodiment of an automatic mailing apparatus according to this invention.
Figure 7:
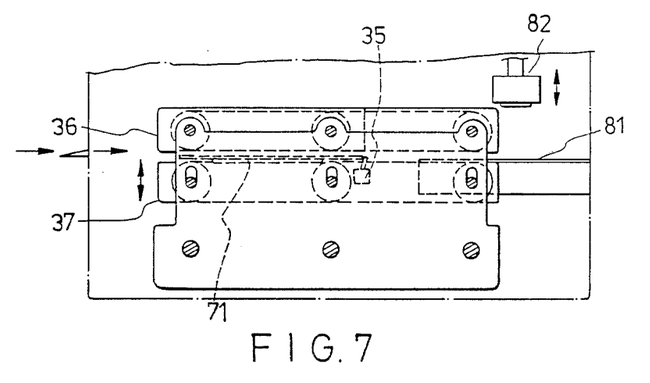
FIG. 7 is a schematic side view illustrating the operative positions of the driving mechanism and the stamping means in FIG. 6.

Referring to FIG. 6, the transfer means 3 is installed in the casing 1 behind the letter insertion and retrieval slot 18 and the shielding plate 24 for performing letter transferring operations. The transfer means 3 includes a driving mechanism 30 comprising a motor (not shown), a rack-and-pinion gearing device 33 and transmission shafts 34, as well as a set of left conveyors 31 and a set of right conveyors 32 which are cooperatively connected with the transmission shafts 34 for effecting synchronous transferring operations therewith. Each of the left and right conveyors 31, 32, has an upper conveyor 36 and a lower conveyor 37. The left conveyors 31 are fixed to the left side of the casing 1 and the right conveyors 32 are driven to be traversely moved toward said left conveyors 31 when a letter to be mailed is initially inserted into the letter insertion and retrieval slot 18. The right conveyors 32 will stop when a limiting switch 321 mounted at the front end thereof is in contact with the edge of said letter so as to clamp the front edge of said letter. In addition, a micro switch 35 is provided between the left and right conveyors 31, 32 so that each lower conveyor 37 of the left and right conveyors 31, 32 can be lowered down and lifted up within a predetermined time period so as to enable the weighing means 7 to perform weighing operations for a letter to be mailed.

The detecting means 5 is installed behind the upper panel of the front panel 10 for detecting the mailing operations performed on the said panel 10 and indicating the detected results. The detecting means 5 comprises a magnetic card identifying device 51, coin identifying device 52, changing device 53 and a cash box 54, as shown in FIG. 3.

Referring now to FIG. 6, the weighing means 7 is mounted between the middle portion of the left and right conveyors 31, 32 and below the same. The weighing means 7 includes an electronic balance 71 which is connected with the detecting means 5 for indicating the weight of a letter to be mailed so that the postage can be calculated and shown on the display screen 19 by the detecting means 7. The stamping means 8 is installed behind the left conveyors 31 for stamping the letter which is weighed by said weighing means 7 after the customer pays the postage shown on the display screen. The stamping means 8 includes a stamping plate 81 and a stamper 82 driven by the motor of the driving mechanism 30.

Referring to FIG. 2, the collecting device 9 is installed in the lower portion of the casing 1. The collecting device 9 includes an inclined guiding plate 91 mounted below the transfer means 3, three collecting boxes A, B, C provided below the guiding plate 91, and three gates 93 formed in the guiding plate 91. Each of the gates 93 is controlled by a solenoid valve 94 so that said stamped letter will drop into one of the collecting boxes through one of the gates respectively facing said collecting boxes.

Figure 8:
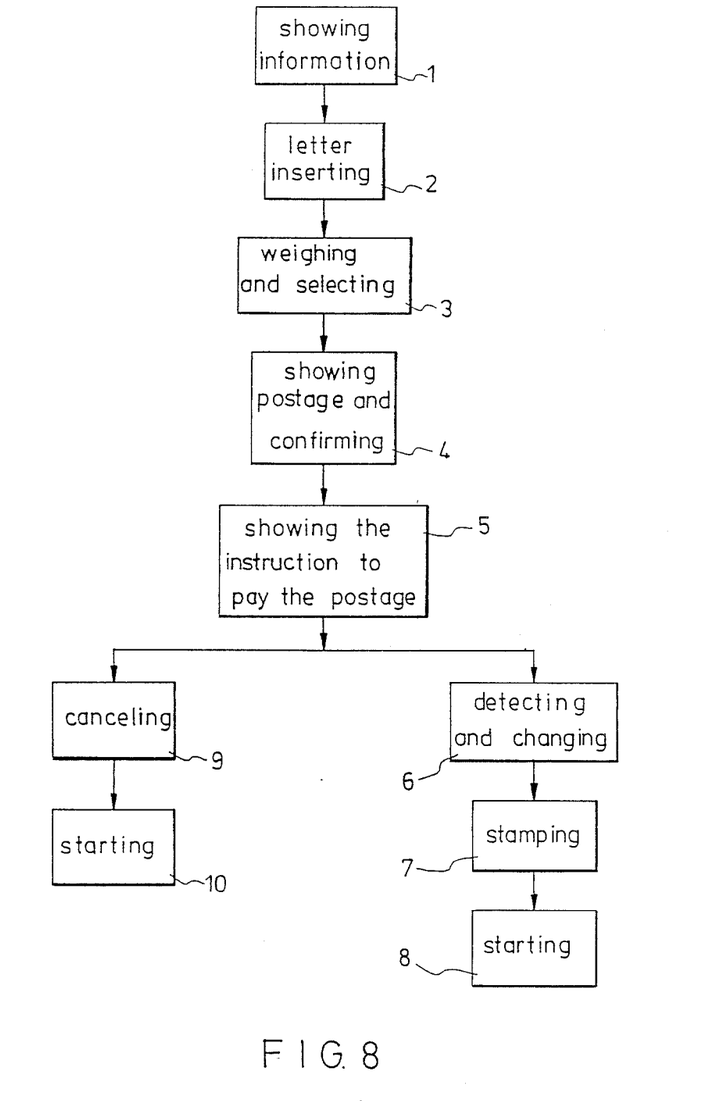
FIG. 8 is a flow diagram showing the operation of the automatic mailing apparatus of this invention.

Referring to FIG. 8, a flow diagram of the operation of the automatic mailing apparatus according to this invention is shown. Before a letter is inserted, an information will be shown on the display screen 19 of the front panel 10 instructing the customer to insert the letter with keeping to the left, as shown in block 1. The customer then moves said letter toward the letter insertion and retrieval slot 18. The letter is then detected by the electric eye 23 and the driving mechanism 30 is energized to activate the shielding plate 24 and the left and right conveyors 31, 32 so that said shielding plate 24 will move to the left thereby uncovering the letter insertion and retrieval slot 18. When the letter is inserted further, the left side of said letter is clamped by the left conveyors 31, and the right conveyors 32 move left to clamp the letter in a manner as described hereinbefore and as shown in block 2. The clamped letter is then transferred to the weighing means 7 for weighing operations as described hereinbefore. The weight of the letter will be shown on the display screen 19. The customer may then choose the type of mailing service which sort of mailing type he/she desires by depressing one of the letter-sorting keys 22. As a result, one of the solenoid valves 94 of the collecting device 9 will be actuated to open the corresponding gate 93, as shown in block 3. The postage will thereupon be calculated according to the weight of the letter and the type of mailing service which the operator selects. The postage will then be shown on the display screen 19 and the customer is asked to confirm if the letter is to be mailed, as shown in block 4. If the customer confirms that the letter is to be mailed, he/she is asked to pay the postage, as shown in block 5. The postage can be paid either by dropping the appropriate amount of the coins into the coin slot 13 or inserting a magnetic card into the magnetic card slot 12. Payment by the customer will be detected by the detecting means 5. The process of providing change to the customer will be carried out by the changing device 53 at the time of payment. Alternatively, the magnetic card will be returned to the customer, as shown in block 6. The weighed letter will then be transferred to the stamping means 8 so that it may be stamped on the left upper-corner thereof, as shown in block 7. After the completion of the stamping process, the stamped letter will be transferred to the end of the right conveyor 32 and drop down to the inclined guiding plate 91. The letter will slide down and fall into the selected collecting box by passing through the opened gate 93 so as to be sorted, as shown in block 8. The customer, however, before paying the postage, can cancel the mailing operation and withdraw the weighed letter by pushing the letter-return key 21, as shown in block 9. The mechanism comprising the automatic mailing apparatus will then revert to their starting positions, as shown in block 10.

It should be note that the letters is held within in the collecting box in the casing of the present invention, will have already been weighed, stamped and sorted when the postal worker retrieves them. Therefore, instead of being performed in the post office, common letter processing procedures can be accomplished by the apparatus of the present invention, saving on the normal time required for letter processing in a post office. In addition, the automatic mailing apparatus of this invention can be installed in many places and operated continually, thus making the mailing of letters very convenient.

With this invention thus explained it is apparent that numerous modifications and variations can be made without departing from the scope and spirit of this invention. It is therefore intended that this invention be limited only as indicated in the appended claims.

I claim:

1. An automatic mailing apparatus comprising:
   a casing with an upper and a lower portion, said upper portion including a front panel having a letter insertion and retrieval slot formed therein for mailing operations;
   a transfer means mounted in said casing behind said letter insertion and retrieval slot of said front panel and provided with a driving mechanism and conveyors for performing letter transferring operations;
   a weighing means mounted in a middle portion of said transfer means in said casing with an electronic weighing balance for indicating the weight of a letter to be mailed;

a detecting means installed behind said front panel for detecting the mailing operations performed on said front panel and indicating the detected results;

a stamping means installed in a rear portion of said transfer means in said casing which includes a stamping plate and a stamper driven by said driving mechanism for stamping a letter being weighed by said weighing means;

a collecting device installed in said lower portion of said casing which has an inclined guiding plate mounted below said transfer means, a plurality of collecting boxes provided below said guiding plate, and a plurality of gates formed in said guiding plate;

wherein, each of said gates is controlled by a solenoid valve so that a letter to be mailed will drop into one of said collecting boxes through one of said gates respectively facing said collecting boxes; whereby a letter received from said letter insertion and retrieval slot can be automatically transferred for weighing, stamping and sorting.

2. An automatic mailing apparatus as claimed in claim 1, wherein said front panel is a combination of an upper panel and a lower panel wherein said upper panel is provided with an indicating light, a magnetic-card slot, a coin slot, a coin-return assembly, an instruction plate, and a trouble lamp, and said lower panel includes a display screen, an on/off control switch, a letter-return key and a plurality of letter-sorting keys.

3. An automatic mailing apparatus a claimed in claim 2, wherein upper panel further comprises a slidable shielding plate installed behind said letter insertion and retrieval slot which is driven by said driving mechanism so as to allow the entrance of a letter to be mailed while at the same time protecting an inside of the apparatus from dust, and a photoelectric sensing device provided adjacent said letter insertion and retrieval slot for being energized to activate said driving mechanism to drive said shielding plate and said conveyors when said letter is detected by said sensing device.

4. An automatic mailing apparatus as claimed in claim 1, wherein said transfer means includes a set of left conveyors and a set of right conveyors, each of said left and right conveyors having an upper conveyor and a lower conveyor wherein said right conveyors are driven traversely by said driving mechanism to move toward said left conveyors when a letter is initially inserted into said letter insertion and retrieval slot and to stop when said letter contacts a limiting switch mounted at a front end of said right conveyors so as to clamp a front edge of said letter.

5. An automatic mailing apparatus as claimed in claim 1, wherein said transfer means further comprises a micro switch provided between said left and right conveyors so that each lower conveyor of said sets of conveyors can be lowered down and lifted up within a predetermined time period so as to enable said weighing means to perform weighing operations for said letter.

6. An automatic mailing apparatus as claimed in claim 4, wherein said driving mechanism included a plurality of transmission shafts associated with said left and right conveyors and a rack-and-pinion gearing device connected with said transmission shaft for effecting synchronous transferring operations therewith.

7. An automatic mailing apparatus as claimed in claim 1, wherein said casing further includes a plurality of letter finishing slots separately provided in said lower portion for receiving finished letters and transferring the same into said collecting boxes.

* * * * *

UNITED STATES PATENT AND TRADEMARK OFFICE
CERTIFICATE OF CORRECTION

PATENT NO. : 4,923,022

DATED : May 8, 1990

INVENTOR(S) : Tzu-Yen Hsieh

It is certified that error appears in the above-identified patent and that said Letters Patent is hereby corrected as shown below:

| Column | Line | |
|--------|------|---|
| 1 | 32 | "shake" should be --sake-- |
| 4 | 37 | "note" should be --noted-- |
| 4 | 37 | After "letters" delete "is" |
| 4 | 37 | Delete "in" |
| 4 | 38 | "invention," should be --invention-- |
| 4 | 40 and 41 | "in stead" should be --instead-- |
| 4 | 44 | "letter processing" should be --letter-processing-- |
| 4 | 49 | "explained" should be --explained,-- |

Signed and Sealed this

Twenty-fourth Day of December, 1991

*Attest:*

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,923,022
DATED : May 8 1990
INVENTOR(S) : Tzu-Yen Hsieh

It is certified that error appears in the above-identified patent and that said Letters Patent is hereby corrected as shown below:

On the title page: Assignee should read --

Chien-Hua Chang, Taou-Yuan, Taiwan, Mao-Hsiug Chang,

Tzu-Yen Hsieh, Taipei, Taiwan, (part interest)--.

Signed and Sealed this

Twenty-eighth Day of April, 1992

Attest:

HARRY F. MANBECK, JR.

*Attesting Officer*      *Commissioner of Patents and Trademarks*

REEXAMINATION CERTIFICATE (2269th)
United States Patent [19]

Hsieh

[11] B1 4,923,022

[45] Certificate Issued Apr. 12, 1994

[54] AUTOMATIC MAILING APPARATUS

[76] Inventor: Tzu-Yen Hsieh, Taipei, Taiwan

Reexamination Request:
No. 90/002,984, Mar. 4, 1993

Reexamination Certificate for:
Patent No.: 4,923,022
Issued: May 8, 1990
Appl. No.: 343,002
Filed: Apr. 25, 1989

Certificate of Correction issued Dec. 24, 1991.

Certificate of Correction issued Apr. 28, 1992.

[51] Int. Cl.⁵ .............. G01G 23/38; G01G 23/22; B07C 5/00; B07C 9/00
[52] U.S. Cl. ................... 177/4; 177/25.15; 364/464.03; 209/564; 209/698; 209/900
[58] Field of Search ............... 177/4, 25.15; 364/464.03; 209/564, 698, 900

[56] References Cited

U.S. PATENT DOCUMENTS

| | | |
|---|---|---|
| 2,733,520 | 2/1956 | Jensen . |
| 3,325,977 | 6/1967 | Kirsten . |
| 3,861,480 | 1/1975 | Zucker et al. . |
| 4,049,068 | 9/1977 | Kavanagh et al. . |
| 4,171,130 | 10/1979 | Jeschke et al. . |
| 4,488,610 | 12/1984 | Yankloski . |
| 4,516,209 | 5/1985 | Scribner . |
| 4,577,763 | 3/1986 | Placke et al. . |
| 4,631,812 | 12/1986 | Young . |
| 4,634,328 | 1/1987 | Carrell . |
| 4,901,808 | 2/1990 | Wu . |
| 4,940,887 | 7/1990 | Sheng-Jung ............ 364/464.03 |

Primary Examiner—George H. Miller, Jr.

[57] ABSTRACT

An automatic mailing apparatus comprises a transfer device, a weighing device, a stamping device, a detecting device and a collecting device. The automatic mailing apparatus is an automatic machine in the shape of a case. The case has a front panel for mailing operations and a letter insertion and retrieval slot formed in the front panel. A letter to be mailed may be inserted into the case through the letter insertion and retrieval slot and automatically transferred for weighing, stamping and sorting.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 4, 6 is confirmed.

Claims 1, 2 and 7 are cancelled.

Claim 5 is determined to be patentable as amended.

5. An automatic mailing apparatus as claimed in claim [1] *4*, wherein said transfer means further comprises a micro switch provided between said left and right conveyors so that each lower conveyor of said sets of conveyors can be lowered down and lifted up within a predetermined time period so as to enable said weighing means to perform weighing operations for said letter.